United States Patent
Vossen

[11] 3,765,286
[45] Oct. 16, 1973

[54] CUTTING APPARATUS
[76] Inventor: Franz Vossen, Op Dem Felde, Germany
[22] Filed: Aug. 21, 1972
[21] Appl. No.: 282,174

[30] Foreign Application Priority Data
Aug. 24, 1971  Germany..............P 21 42 298.0

[52] U.S. Cl..................... 83/284, 83/318, 83/325, 83/512
[51] Int. Cl..................... B23d 25/04, B23d 25/12
[58] Field of Search................... 83/284, 318, 325, 83/512, 510

[56] References Cited
UNITED STATES PATENTS
2,751,003   6/1956   Mueller.............................. 83/284
3,203,288   8/1965   Blumer............................. 83/325 X
3,057,241   10/1962  Chambon............................ 83/510
2,737,238   3/1956   Rowlands........................... 83/510 X Primary Examiner—Willie G. Abercrombie
Attorney—Lawrence I. Lerner et al.

[57] ABSTRACT

In a cutting apparatus for sheets of paper, cardboard, etc., a reciprocating cutting table carrying a cutting die cooperates with a counter cutting means subdivided in a plurality of individual cutting elements each rolling-off only a partial area of the cutting tool. This results in a considerable decrease in space required for a table stroke as well as in a shorter and therefore simpler guidance of the table.

12 Claims, 5 Drawing Figures

CUTTING APPARATUS

BACKGROUND OF THE INVENTION

1. Field of the Invention

This invention relates to cutting apparatus, preferably operating on an automatic basis, for sheets of paper, cardboard, foil material or the like, in particular to cutting apparatus of the type in which a reciprocating die carrying plate cooperates with a counter cutting means having surfaces of circular arc cross-section rolling along the surface of the die carrying plate, with the material to be cut interposed therebetween.

2. Prior Art

In known cutting apparatus of the type described a horizontal lower cutting table carrying the cutting tool is moved along a cylinder to which a cutting plate is mounted and which is rolled off the upper surface of the cutting table, together with the sheet to be cut clamped thereto. This kind of cutting apparatus is advantageous insofar as the cutting tool during the entire cutting operation linearly merely engages that generatrix of the cutting cylinder which just happens to face the cutting table disposed below the cutting cylinder, so that only minor control and adjustment are necessary. In view of this, the type of cutting apparatus including a cutting cylinder is superior to so-called reciprocal cutting machines which comprise an upper and a lower table for which uniform mutual engagement must be warranted not only along a certain line (such as the aforementioned generatrix), but over the entire cutting area. Moreover, cutting with known cutting apparatus comprising a lower table and a cylindrically shaped counter cutting means involves a roll-off process which as compared to a mere pressing operation (as occurring in connection with the aforementioned so-called reciprocal machines) exhibits the additional advantage that considerably higher specific pressures may be used which, in turn, lead to proportionally lower cutting forces. Insofar, cutting tools as well as the remaining machine structure are subjected to a comparatively low strain so that the entire machine will have to be less sturdy.

However, in practical use of the aforementioned cutting apparatus of the rotary type it is cumbersome and time consuming that each sheet must be clamped into the cutting cylinder, whereas the possibility is excluded to feed the sheet material as a coherent continuous web. Since the cutting cylinder equipped with the cutting plate is disposed above the cutting table carrying the cutting tool or cutting die, the printed surface of printed sheet material must be turned in downward direction so that the print and the precise registry of cutting pattern and printing pattern may not be controlled during the actual cutting operation. In conjunction with known cutting apparatus of the rotary type, difficulties are particularly encountered with respect to the guidance of the cutting table which must be reciprocated over its full length so that sufficient space must be provided in the longitudinal direction of the cutting apparatus allowing to receive at least twice the full table length. In addition, an accurate guidance of the lower table over a distance equal to at least twice its length is a rather delicate task entailing a considerable amount of respective provisions.

Further, cutting machines are known that have two stationary rotatably supported cylinders between which the sheet material to be cut is fed, one of the two cylinders being designed as cutting cylinder carrying the cutting tool and the other cylinder being designed as counteracting cylinder provided with the cutting plate. This type of cutting machine permits continuous operation, i. e., the sheet material may be supplied continuously, however, a rigid pattern or pitch must be maintained the length of which corresponds exactly to the circumference of the cutting cylinder carrying the cutting tool. If the actual sheet length is less than the circumference of the cutting cylinder, the differential material corresponding to the difference between the selected sheet length and the larger circumference of the cutting cylinder results in a substantial amount of waste and thus in an uneconomical production, in particular when it is taken into account that this waste, related to the full length of the sheet material to be cut, is encountered many times. A certain remedy may possibly be achieved by making the cylinders interchangeable so that a better adjustment of the cylinder circumference to a respective sheet extension may be performed. However, this means that several cylinders of different diameters must be available and, beyond that, that the necessary replacement work must be carried out.

With regard to the last mentioned type of cutting apparatus. it is particularly critical to equip the cutting cylinder with the cutting tool because the curved surface of the cutting cylinder calls for respectively curved cutting blades. Preparing such curved cutting blades involves expenses being a multiple of the expenses caused by the manufacture of plane cutting blades.

It is therefore an object of the invention to provide a cutting machine of the type initially mentioned having principally the same advantages as the aforementioned cutting machine including a horizontally reciprocal lower table and a cutting cylinder rotatably mounted on top thereof, but which requires an essentially shorter stroke for the reciprocal motion of the table and thus a shorter and consequently simpler guidance for that table.

SUMMARY OF THE INVENTION

According to the invention, the cutting cylinder of a prior art cutting machine of the rotary type which includes a reciprocating die carrying plate cooperating with the cutting cylinder, is subdivided into a plurality of individual cutting elements. Each of these individual cutting elements is provided with curved operative surfaces of circular arc cross-section, and each of these partial operative surfaces cooperates with a respective portion of the cutting tool. Consequently, the cutting table is to be shifted merely over a distance so that the partial operative surfaces may roll-off the associated partial area of the cutting table so that the stroke of the table necessary in order to perform a full cutting operation may be reduced to the arc length of a cutting element and does not have to correspond any more to the full circumference of a cutting cylinder as in previous cutting machines of the type including a rotary cylinder and a reciprocal table.

Thus, the necessary length of the machine is reduced and guidance of the cutting table is simplified. Nonetheless, the sheet material to be cut may be treated in a continuous manner. Due to the linear contact between the cutting table and the cutting elements and the rolling-off cutting action high specific pressures may be applied whereas the cutting forces as such — as compared for example with the aforementioned reciprocally acting cutting machine where the large areas of the two opposing tables must be in full registry — may be kept at a low value. Because of the low cutting forces the mechanical strength of the machine may be relatively low allowing for a low weight of the entire machine structure. Moreover, cutting operation may be carried out at high speed.

The cutting machine according to the invention permits it to dispose the cutting table above the counteracting cutting elements so that the prints of printed sheet material may be directed upwardly and thus may be observed in a continuous manner.

Air cushions applying a supporting force in upward direction onto the sheet material may be provided between adjacent cutting elements so that a plane horizontal motion of the sheet material is ensured.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENT

Figure 1:
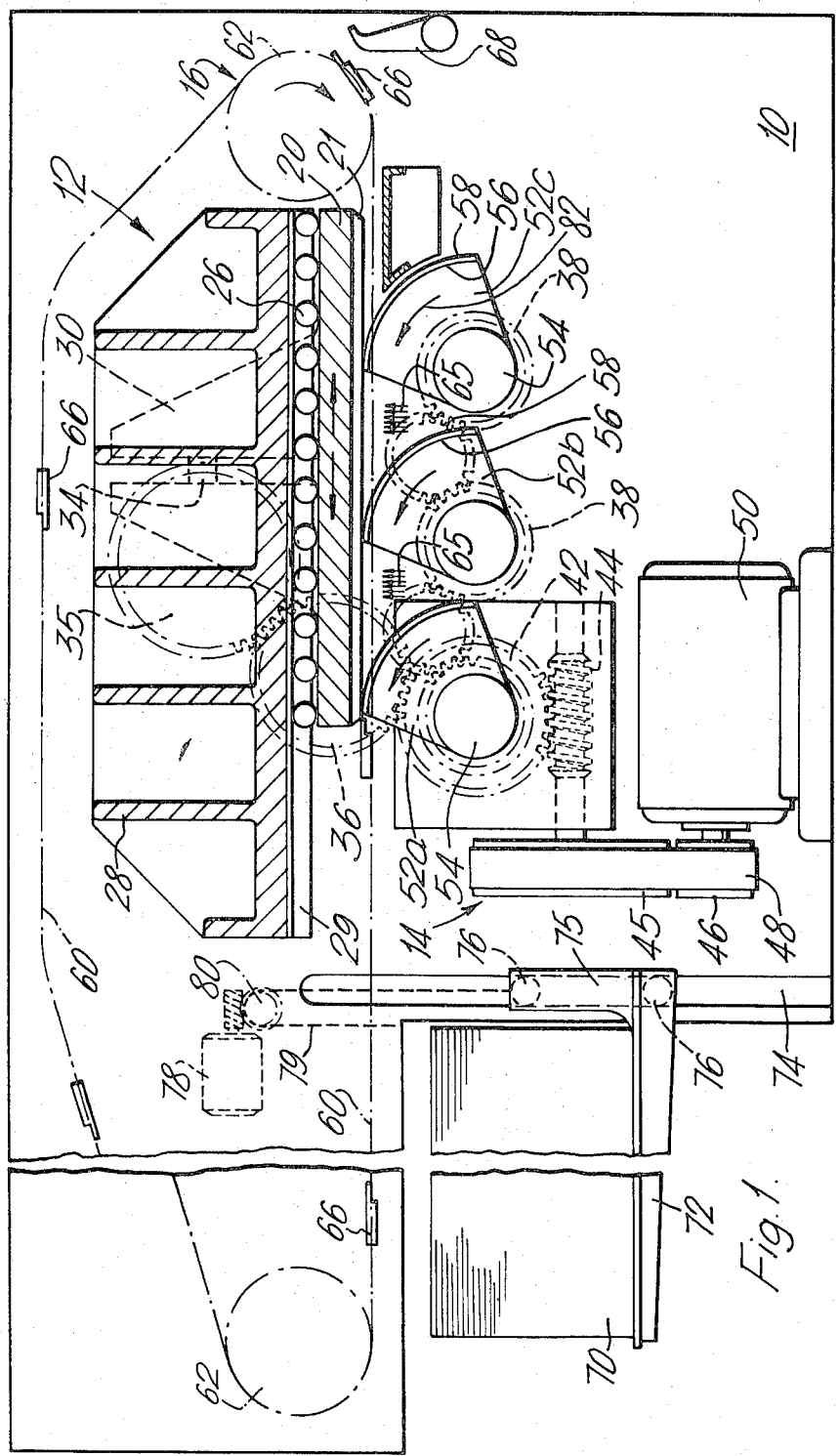
FIG. 1 schematically shows a longitudinal cross-section through a cutting machine embodying the invention.

FIG. 1 schematically illustrates a frame generally designated 10, carrying a cutting system, a driving system and a transportation system for the material to be cut,- generally designated by reference numerals 12, 14, 16, respectively.

Figure 2:
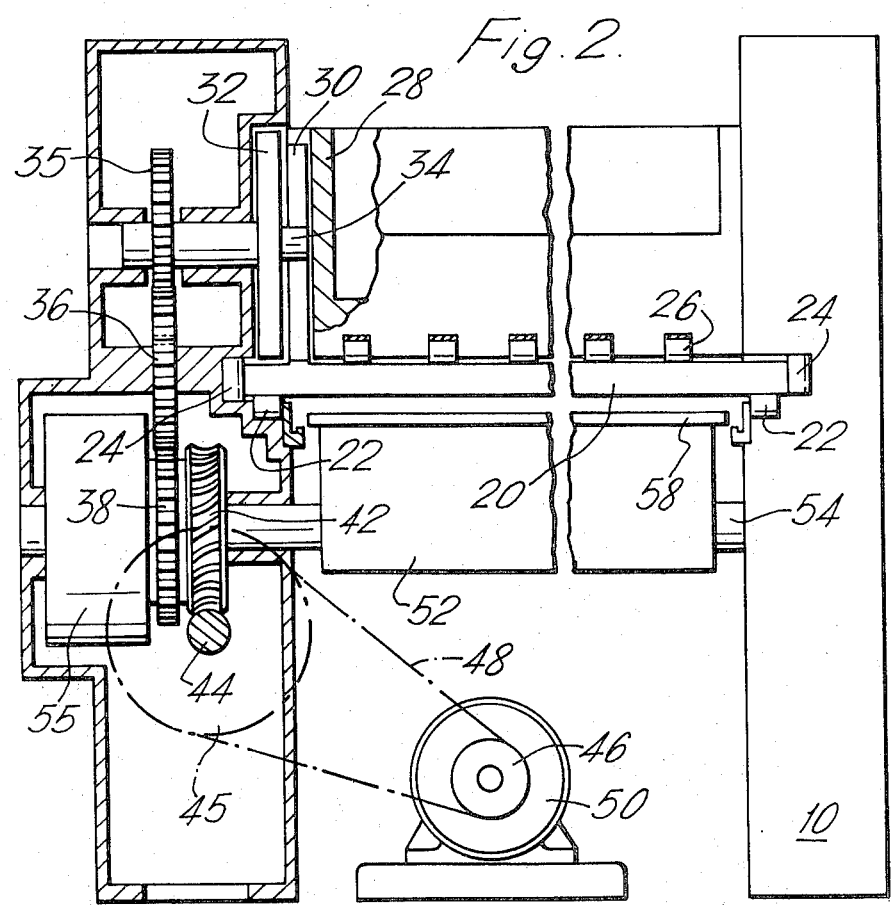
FIG. 2 shows a transverse cross-seciton through FIG. 1 substantially taken along the line II—II in FIG. 1.

The cutting system 12 includes a cutting table 20 reciprocally guided in longitudinal direction of the cutting machine of this invention or frame 10, respectively. To the lower surface of cutting table 20, a plane cutting tool 21 is mounted. The cutting tool, in a conventional manner, is composed of a network of cutting blades arranged in compliance with the desired cutting pattern. As indicated by FIG. 2, the cutting table 20 at its opposite side has projections by which it rests upon support members 22. Lateral guide members 24 prevent the cutting table from lateral displacement. A roller bearing 26 is interposed between the upper surface of cutting table 20 and an adjacent lower surface of a stationary bearing body 28 rigidly affixed to frame 10. The roller bearing body 28 extends over the full length of cutting table 20. By means of the roller bearing 26, cutting table 20 may be pressed against the bearing body 28 but nevertheless may be shifted relative thereto in a longitudinal direction.

In order to generate the reciprocal motion of the cutting table, a template 30 is mounted to the upper surface of the cutting table which comprises two substantially symmetrical wings extending perpendicularly relative to the major surface of the cutting table. A guiding slot is defined between the two wings of template 30, and a slide 34 slidingly engages that guiding slot which slide 34 is rotatably mounted to a driving gear 32 by means of which the table 20 may be subjected to an oscillating motion. Via intermediary gears 35, 36 the driving gear 32 may be coupled to a gear rim 38 which surrounds a stubshaft 54 supporting a cutting element 52a. Gear rim 38 is further coupled to a worm wheel 42 disposed adjacent thereto and coaxially therewith which meshes with a worm screw 44. Worm screw 44 at its one end terminates into a driven belt pulley 45 which is driven by a belt 48. A driving belt pulley 46 mounted to the output shaft of a driving motor 50 serves to apply the torque generated by driving motor 50 to belt 48.

By means of the driving mechanism including the slide 34 mounted to the periphery of driving gear 32 the cutting table 20, in a desired manner, is accelerated and decelerated, respectively, in compliance with a sinus function when reciprocated in horizontal direction. Since the individual cutting elements of the counteracting cutting means must be accelerated and decelerated, respectively, according to exactly the same function as the cutting table so that a motion of the cutting table and the counteracting cutting device relative to each other is avoided, the worm wheel 42 or the gear rim 38 coupled thereto, respectively, drive a so-called intermittent transmission gear 55 which at its output is coupled to stub shaft 54, thereby accelerating and decelerating, respectively, stub shaft 54 in a sinus-like manner similarly as slide 54 acts upon cutting table 20.

Beside the aforementioned stub shaft 54 in the presently described embodiment of the invention two additional similar stub shafts 54 are provided being equally spaced from each other and extending below cutting table 20 in a direction perpendicular to the longitudinal direction of frame 10. Each of these stub shafts 54 likewise carries a segment-like shaped cutting element 52b and 52c, respectively. The cutting elements 52 all are defined by circumferential surfaces 56 having a circular arc cross-section and being concentrical with their respective stub shafts 54. Cutting plates 58 extend along the circular arc shaped supporting surfaces 56 of the cutting elements 52. The cutting plates 58 are sufficiently close to the cutting tool 21 to press the sheet material fed between the cutting elements and the cutting table against the cutting tool so that the cutting tool may exert a cutting action upon the sheet material.

In order to guide the sheet material during the cutting operation gripping carriages 66 are provided in a conventional manner which extend between control chains 60 at regular intervals. The control chains 60 are guided by means of sprocket wheels 62 in connection with guiding rails (not shown). Means may be provided to generate air cushions particularly between adjacent cutting elements 52 so that the sheet material between the cutting elements is maintained in the necessary horizontal position. The air cushions 65 are produced by an air stream flowing in upward direction toward the lower surface of the sheet material to be cut — as indicated by the groups of arrows in FIG. 1 —, and the intensity of the air stream preferably may be varied in order to obtain an adjustment corresponding to the respective weight of the material to be treated and to keep the sheet material in its required balanced condition.

Instead of gripping individual sheets by gripper carriages 66, the sheet material alternatively may be supplied as a continuous web.

In that region of frame 10 as represented on the left side of FIG. 1, there extends a receiver table 72 in a substantially horizontal direction which collects the cut sheet material in the form of a pile 70. At its end facing the frame 10 the receiver table 72 may terminate in a post 75 disposed perpendicularly to the surface of receiver table 72. Receiver table 72 engages a vertical longitudinal slot 74 provided in frame 10 by means of upper and lower rollers 76 so that the table 72 may be shifted in an upward or downward direction relative to frame 10. At its upper end, post 75 is connected to a traction chain which engages a drive sprocket 80 mounted to a driving mechanism 78. When driving mechanism 78 is operated in one or the other direction, receiver table 72 will move upward or downward, depending on the driving direction of driving mechanism 78 which acts upon receiver table 72 by means of drive sprocket 80 and traction chain 79 whose end remote from the end mounted to the receiver table 72 is rigidly connected to frame 10. Thus, the upper level of pile 70 may be maintained at a constant level, regardless of the actual height of pile 70.

The supply of sheet material to the cutting table and the cutting segments, respectively, takes place by a schematically represented material supply lever 68 in front of which a conventional device for delivering individual sheets in an appropriately timed manner is positioned in case the material to be cut has the form of individual sheets rather than that of a continuous web.

Figure 3A:
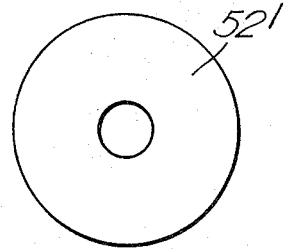
FIG. 3a – c show several contures of the cutting elements.
Figure 3B:
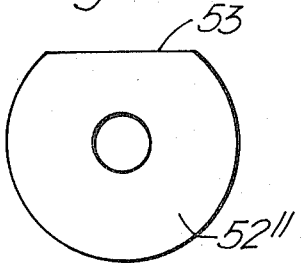
Figure 3C:
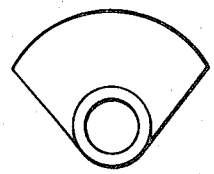

The cutting elements may be of different configuration. Whereas cutting elements 52a – c of FIG. 1 each have the form of prisms with a circular segment-like cross-section (confer also FIG. 3c) FIG. 3a represents a cutting element 52' having a further possible cross-section. This cutting element 52' has the shape of a regular cylinder so that a simple geometry is obtained. However, when cutting elements according to FIG. 3a are used, specific measures are necessary in order to enable an unobstructed retraction of cutting table 20 in its initial position as shown in FIG. 1. FIG. 3b therefore shows a further embodiment of a cutting element 52" which has a circular segment-like cross-section having a contour line composed of a circular arc and a straight line connecting the two ends of that circular arc. This circular segment-like shaped cutting element 52", upon completion of a cutting operation, may be rotated in an angular position so that its flat surface 53 extends parallel to the major plane of cutting table 20, thereby enabling a free and unobstructed retraction of cutting table 20 past cutting element 52". FIG. 3c, for purposes of comparison, illustrates the cutting element cross-section as used for the embodiment of FIG. 1, that is a circular sector cross-section. As will be understood, the effective length of the periphery of the cutting elements illustrated in FIG. 3a or FIG. 3b, respectively, constitutes only a fraction of the full periphery, that fraction corresponding for example to the arc length employed for a cutting element of FIG. 3c. This, at least, is the preferable approach even though, depending on the circumstances and the diameter of cutting elements whose cross-section corresponds to that as shown in FIG. 3a and FIG. 3b, the full periphery may be employed as long as it follows a circular path permitting a roll-off motion of the cutting elements with regard to the cutting table.

The effective arc lengths of the plurality of cutting elements used in cooperation with a common cutting table each are equal and slightly less or at the most equally long as the fraction of the full table length through which the table is reciprocated so that the areas engaged by the operating surfaces of the cutting elements or the cutting plates attached thereto either accurately terminate into each other or are separated from each other by but a very small strip. The sum of all effective lengths will then equal the full length of the cutting table in longitudinal direcdon of frame 10. The effective length is that portion of the cutting segment circumference which actually cooperates with the cutting table surface or engages the lower surface of the sheet material, respectively. The actual arc lengths of the cutting elements, however, may be slightly larger than the respective effective arc lengths so that the circumferential surfaces overlap each other in marginal areas when the cutting elements are rolled-off the cutting tool.

The operation of the cutting machine according to this invention is as follows: Provided the sheet material is not supplied as a continuous web, an individual sheet is transmitted by material supply lever 68 to the nearest gripper carriage 66 which is moved on by the control chain 60 to which it is affixed so that the sheet material is fed between the three cutting elements 52a – c on the lower side and the cutting table 20 on the upper side, the air cushions 65 additionally supporting the sheet material at its lower surface. By means of driving system 14 cutting elements 52a – c are rotated in counter-clockwise direction (with reference to FIG. 1), and simultaneously the cutting table 20, in synchronism therewith, is shifted toward the opposite end of frame 10 which is located at the left side of FIG. 1, so that cutting table 20 enters a free space 29 below the stationary bearing body 28 extending beyond cutting table 20 through said free space when the cutting table is in its normal position. Due to the synchronized driving action exerted upon the cutting elements on the one hand and the cutting table 20 on the other hand, the cutting plates 58 of cutting elements 52a – c are rolled-off the lower surface of cutting table 20 without any relative movement therebetween so that the sheet material extending between the cutting table 20 and the cutting elements 52 and precisely following the motion of cutting table 20 is continuously pressed against the cutting tool 21 in a slip-free manner, thus being provided with the desired cuts or folding lines in three subsequent partial areas.

Upon arrival of the cutting table 20 in its left end position the cutting elements 52, which then continue their rotation in counter-clockwise direction, will release the treated sheet material carrying the blanks and the waste material still adhering thereto so that this may be transmitted by means of the control chain 60 to the pile 70 in order to be deposited on top thereof.

In the course of a cutting cycle the cutting elements perform a full rotation such that they reach their initial position as illustrated in FIG. 1 when the cutting table 20 upon a full rotation of driving gear 32 has been retracted into its initial position as shown in FIG. 1.

While the cutting elements have been described as performing a continuous unidirectional motion, they may also be actuated in a reciprocal or oscillating manner if this would result in a more suitable solution, for instance, when cutting elements having the cross-section according to FIG. 3b are used.

As apparent, the cutting table 20 is shifted over only a fraction of its full length (i. e., over a distance corresponding to the free space 29) so that a comparatively short overall length of frame 10 will be sufficient. Supposed the cutting element would be a normal cylinder as used heretofore in cutting machines of the type here in question, it would of course be necessary to reciprocate cutting table 20 through a distance corresponding at least to its full length so that a frame 10 for a cutting machine of the same capacity would require substantially more space. Beyond that, it would be a much more complex task to provide for an accurate and reliable guidance of the cutting table over such a comparatively long distance. The fractional length through which the cutting table is reciprocated preferably substantially equals the reciprocal of an integer multiple of the full table length, that is one half, one third, one fourth etc., of the full table length so that two, three, four etc., partial cutting elements may be used for co-operation with the cutting table which in total engage the entire cutting tool area without any remainder.

What is claimed is:

1. Cutting apparatus for sheets of paper, cardboard, foil material or the like, having a cutting table reciprocal parallel to its major surface, a cutting tool mounted to said cutting table, counteracting cutting means defined by a working surface of circular arc cross-section facing said cutting tool, at least one cutting plate being supported by said working surface coaxially therewith, means for reciprocating said cutting table and for rolling said cutting plates off said cutting tool in synchronism therewith, the improvement herein comprising means for slideably reciprocating said cutting table over only a fraction of its full length, a plurality of cutting elements constituting said counteracting cutting means, each carrying an individual cutting plate of circular arc cross-section and of equal effective arc length, said effective arc lengths each being slightly less or at the most equally long as said fraction of the full table length and in summary having at the most a circumferential extension equalling the length of the cutting table.

2. The cutting apparatus of claim 1, wherein said fractional length substantially equals the reciprocal of an integer multiple of the full table length.

3. The cutting apparatus of claim 1, wherein said means for slideably reciprocating said cutting table includes a stationary bearing body for longitudinally guiding said cutting table, the length of said bearing body in the direction of movement of the table at least equalling the table length plus said fractional length.

4. The cutting apparatus of claim 1, wherein said means for reciprocation includes a driving motor and gear wheels fastened to each of said cutting elements coaxially therewith, said gear wheels meshing with each other in series connection, the first one of them being coupled to said driving motor.

5. The cutting apparatus of claim 1, wherein the circumferential surfaces of the cutting elements have actual arc lengths slightly larger than said effective arc lengths, so that the circumferential surfaces have marginal areas overlapping each other when said cutting elements are rolled-off said cutting tool.

6. The cutting apparatus of claim 1, wherein said cutting table is disposed above said cutting elements.

7. The cutting apparatus of claim 1, including means for generating air cushions at least intermediate adjacent cutting elements for additionally supporting the lower side of a sheet of paper or the like traversing the cutting apparatus.

8. The cutting apparatus of claim 1, wherein said cutting elements are formed by prisms having a circular sector-like cross-section.

9. The cutting apparatus of claim 1, wherein said cutting elements are of cylindrical shape.

10. The cutting apparatus of claim 1, wherein said cutting elements are formed of prisms having a circular segment-like cross-section.

11. The cutting apparatus of claim 1, wherein said means for rolling said cutting plates off said cutting tool provide for unidirectional rotation of said cutting elements.

12. The cutting apparatus of claim 1, wherein said means for rolling said cutting plates off said cutting tool provide for reciprocal rotation of said cutting elements.

* * * * *